United States Patent [19]
Hagman

[11] Patent Number: 5,314,174
[45] Date of Patent: May 24, 1994

[54] ERGONOMIC WORKPIECE POSITIONER

[76] Inventor: Erland L. Hagman, One Austin Dr., New Fairfield, Conn. 06812

[21] Appl. No.: 28,693
[22] Filed: Mar. 8, 1993
[51] Int. Cl.$^5$ .............................................. B23Q 1/04
[52] U.S. Cl. ........................................ 269/75; 269/20
[58] Field of Search ................ 269/45, 71, 75, 81-83, 269/20; 248/181, 180, 288.3, 481, 483

[56] References Cited

U.S. PATENT DOCUMENTS 4,143,866  3/1979  Bergman .............................. 269/20
4,564,179  1/1986  Hollingsworth ...................... 269/83
4,957,359  9/1990  Kruse et al. .......................... 248/483
4,974,802  12/1990 Hendren .............................. 248/181

Primary Examiner—Robert C. Watson
Attorney, Agent, or Firm—Edward R. Hyde

[57] ABSTRACT

A ball and socket type universal workpiece support is provided that is locked in its normal state. A balanced system of spring force is provided to lock the positioner in any position chosen by the operation. It will remain in the selected position until fluid pressure is provided to release it for movement to another position.

14 Claims, 3 Drawing Sheets

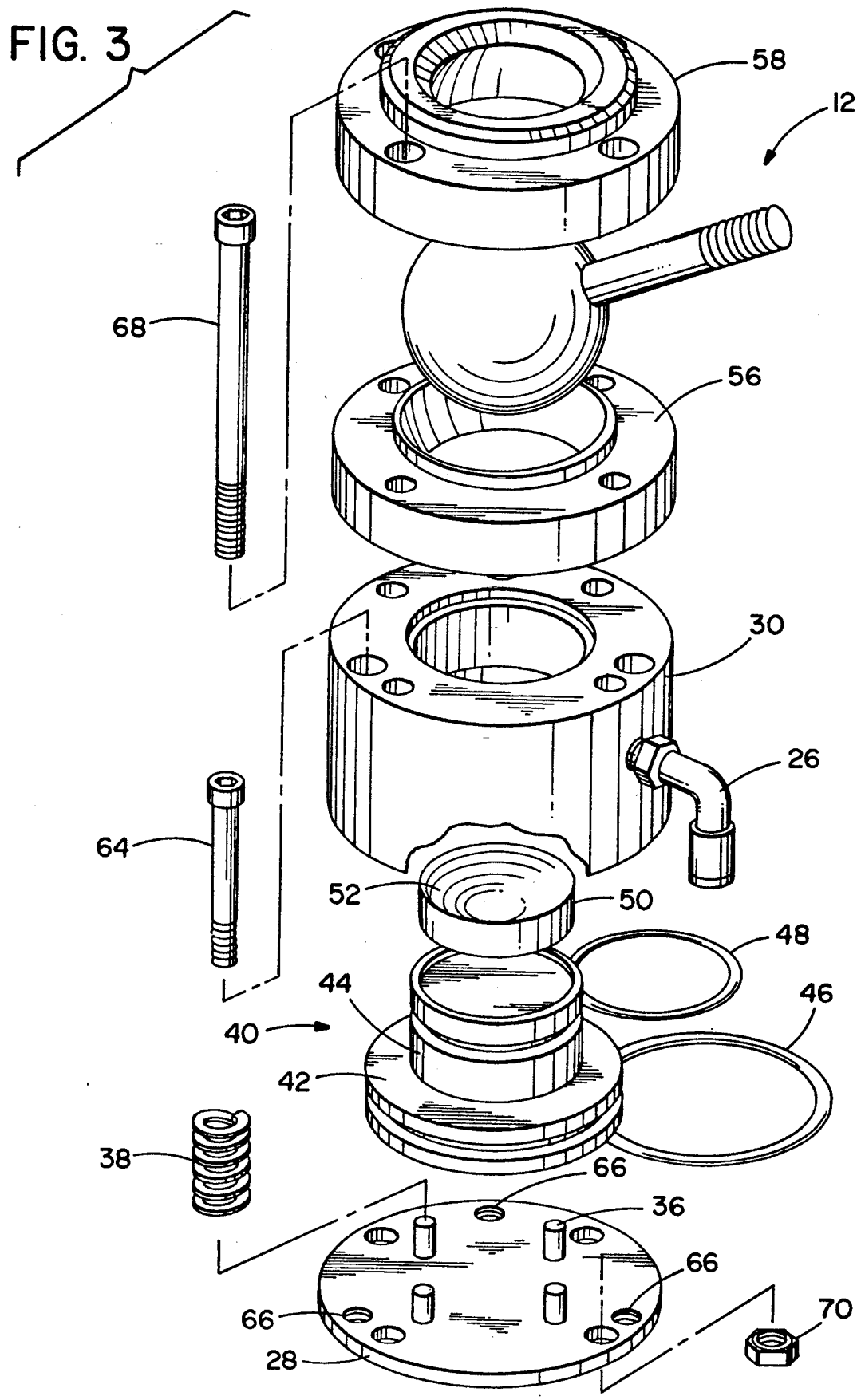

ERGONOMIC WORKPIECE POSITIONER

BACKGROUND OF THE INVENTION

1. Field of the Invention

The present invention relates to a universal workpiece positioner and more particularly to a holder for a workpiece to be operated upon in which the workpiece may be moved and retained in a desired position.

In the manufacture of various items it is often necessary to position the item to conveniently perform an operation upon it such as welding, painting, forming, assembling, etc. The items may take various forms and sizes and may be small such as a circuit board or as large as perhaps a section of an automobile body.

Accordingly, it is desirable to have a workholder to which a large variety of items to be worked upon may be secured and in which the workholder may be freely adjusted to position time item in an ergonomically correct work position for the operation to be performed.

2. Description of the Prior Art

There exists a considerable number of universal ball and socket type of workholders for securing workpieces in a particular position. One type of such workholder contemplates a pneumatic system for holding the ball in position within its socket after the ball with the workpiece attached has been manipulated to the desired position. A particular disadvantage of this system of the prior art is that when the pneumatic pressure is released or in the event of air leakage the ball with a workpiece attached may move under the force of gravity to change its position and perhaps cause damage and injury to an operator or associated equipment. Examples of these prior art devices are shown in U.S. Pat. Nos. 2,354,937, 2,559,925 and 3,638,973. The systems of these patents all depend on fluid pressure to maintain the universal workpiece holder in the fixed predetermined position.

SUMMARY OF THE INVENTION

Against the foregoing background is a primary object of the present invention to provide a workholder of the universal ball and socket type that is maintained in its fixed predetermined position in the absence of pneumatic pressure or any other external control system.

A further object of the present invention is to provide a universal workpiece support in which fluid pressure is provided to release the ball and socket support from its predetermined position so that it may be moved to another convenient work station as required in many automation applications without disturbance of its set position.

Accordingly there is provided a ball and socket type universal workpiece support that is locked in position in its nominal state. A balanced system of spring force is provided to lock the universal work positioner in any position chosen by the operator. It will stay in this position until sufficient fluid pressure is provided to release it for movement to another position.

Thus there is provided a safe universal workholder adapted to support a workpiece in a fixed predetermined position in which it will remain without the dependence of an outside source of fluid pressure. The workholder with workpiece attached may be moved from one location to another as with an assembly line arrangement.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which:

FIG. 3 is an exploded view of the workholder of FIG. 2;

FIG. 5 is a view of the workholder system holding a workpiece that an operator is working on.

DESCRIPTION OF A PREFERRED EMBODIMENT

Figure 1:
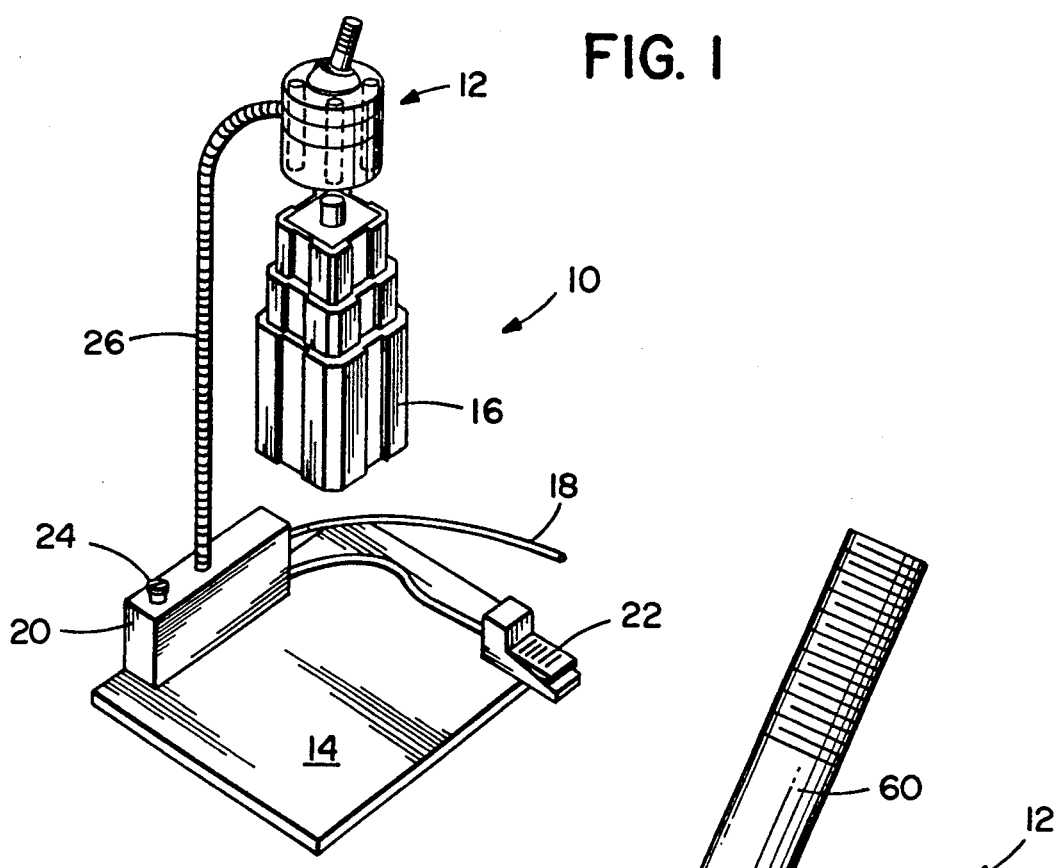
FIG. 1 is a perspective view of the workholder with an associated pedestal and mount.

Referring now to the drawings and more particularly to FIG. 1 there is shown a workpiece holder system designated 10 which includes the workpiece holder 12 of the present invention.

The system, includes a support plate 14 upon which a telescopic pedestal 16 may be mounted to support the workpiece holder 12. As will be described hereinafter, a pneumatic system is provided to release the workpiece under control of the operator. The pneumatic system, includes a source or pneumatic pressure (not shown) connected by a supply tube 18 to a pneumatic control mechanism 20 (hereinafter described) housed in a control box. The control system may be operated by a footpedal 22 and a hose or tube 26 connects the control system to the workpiece holder 12. The pneumatic control system serves to apply fluid under an operator controlled regulated pressure level through regulator 24 to the workpiece holder.

Figure 2:
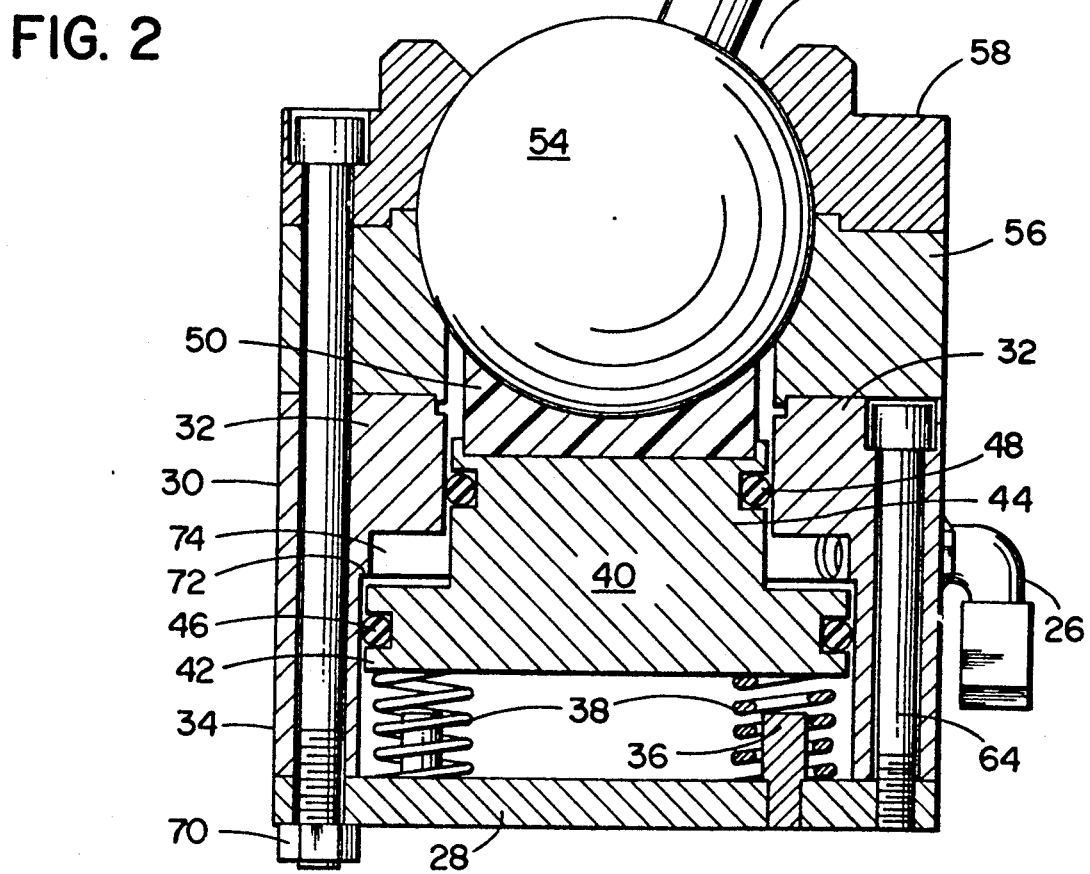
FIG. 2 is a sectional view of the workholder of the present invention.

Referring now to FIGS. 2 and 3 there is shown the construction of the workpiece holder 12. A circular base plate 28 supports a cylindrical casing 30 which has an upper inwardly extending portion 32 and a lower portion 34. Four studs 36 are secured to the upper surface of base plate 23 in an equally spaced manner and serve to position four coil springs 38 which bear against the upper surface of the base plate. The springs serve to support a piston 40 which is stepped to provide a layer portion 42 and upper portion 44. The outer surfaces of the upper and lower piston portions are recessed to receive O-rings 46 and 48 to effectively seal the outer surfaces of the piston 40 to the inner surfaces of casing portion 34 and 32 respectively as seen in FIG. 2.

The upper surface of piston 40 is recessed to receive a circular lock pad 50 which has a spherical upper surface 52 that receives a spherical ball 54 which may rotate on the surface 52. A lower socket ring 56 rests upon the upper surface of casing 30 and an upper socket ring 58 rests upon the lower ring 56. Both socket rings have internal spherical surfaces of the same diameter as the ball 54. Thus it is seen that the upper surface of lock pad 50 and the inner surfaces of the socket rings 56 and 58 form a socket within which ball 54 may rotate.

The upper socket ring 58 is opened at the top to permit access to the ball to which is secured an arm 60 that may be threaded at the end to conveniently hold a workpiece. The opening in the upper socket ring 58 permits ample room for the arm 60 to be moved about in any one of a large number of positions. It has been found that an opening 62 in socket 58 to permit arm 60 to move to a 45 degree angle from the vertical is especially convenient for normal operation of the workpiece positioner.

The assembly is held together by suitable machine screws. In the embodiment shown there are three screws 64 that pass through holes in the casing 30 and are received in screw threaded openings 66 in the base plate 28. The heads of screws 64 are received in appropriate recesses in the upper surface of casing 30.

An additional set of four machine screws 68 pass through holes in the upper and lower socket rings 58, 56, casing 30 and base plate 28 and are received in threaded nuts 70. In this manner the workpiece holder units are held together in a tight unitary structure. With the screws 58 tightened, the ball 54, lockpad 50 and piston 40 are forced downward so that the springs 38 are in compression yielding an upward static force.. The friction between the surface 52 of lockpad 50 and the portion of the ball 54 engaging surface 52 and the spherical surface of socket ring 53 is such that the ball and its associated arm and attached workpiece are held in a fixed locked position. The lockpad 50 is of a high friction material to cause sufficient friction to maintain the ball in a fixed position under the compression of the springs 38.

The inner surface of the lower portion of casing 34 has a lip 72 which serves as an upper stop for piston 40. A circular channel 74 is fanned by the upper surface of the levier portion 42 of piston 40 and the lower surface of the inward extending portion 32 of casing 30 which connects to the fluid pipe 26. Thus when it is desired to move the ball and workpiece holder on 60 to reposition a workpiece, a controlled amount of fluid pressure is massed through pipe 26 to the channel 74 that provides the appropriate dynamic force against the static force created by springs 38 to lower piston 40 and lockpad 50 to permit controlled rotation of ball 54.

Figure 4:
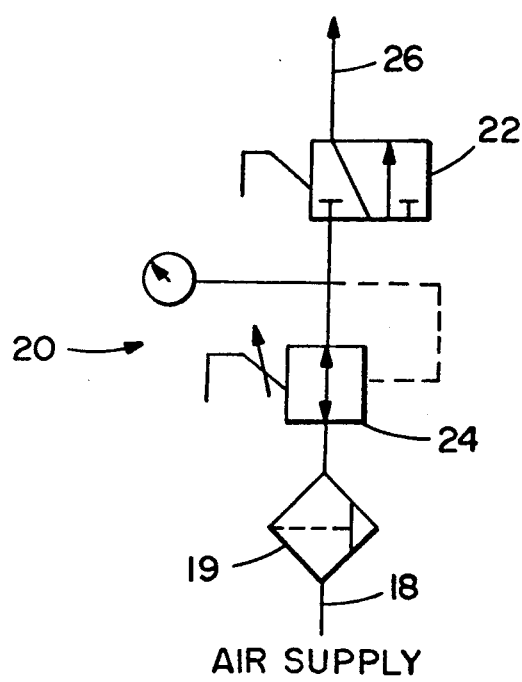
FIG. 4 is a schematic view of the pneumatic control system.

Referring to FIG. 4 there is schematically shown the pneumatic system comprising the pneumatic control mechanism 20 and foot pedal controlled valve 22. The air supply connected to hose 18 is passed through a filter 19 to a pressure regulator 24 which may be manually adjustable to control the air pressure for the system. This pressure creates a downward force that counteracts the spring pressure providing a force component that causes a proportional retraction of piston 40 and ball 54 from its engagement with the lockpad 50. It is understood that an excess of pneumatic pressure will free the ball from the lock pad 50 and permit it to freely rotate with the attached workpiece in an uncontrolled manner. To prevent this the operator will adjust the regulator 24 to provide appropriate pressure to only partially overçome tile lockpad-ball friction providing adjustment firmness and overall stability to the positioning system. In this manner the arm 60 with the attached workpiece can securely be manually moved by the operator to a new desired position.

Figure 5:
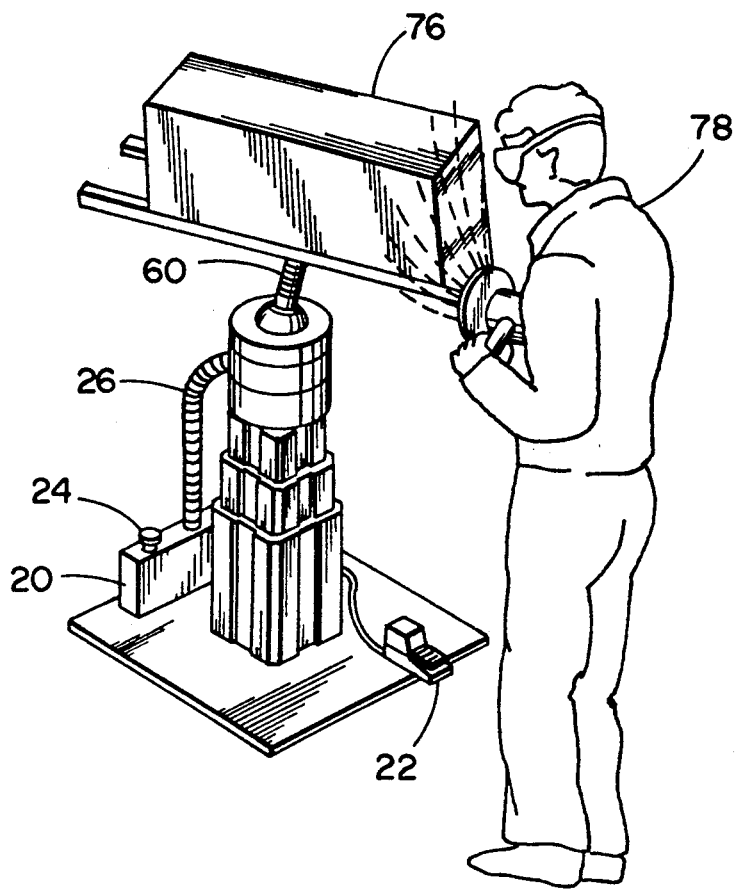

Referring now to FIG. 5, there is shown the workpiece holder system holding a workpiece that is being operated upon. The workpiece 76 may be of any convenient size and configuration and is suitably secured to arm 60. In the embodiment shown the operator 78 is sanding the workpiece with a rotary sander. It is understood that the particular operation may take any form and be of any of the varities of operations performed on workpieces as for example, in an assembly line. The operator, after securing the workpiece 76 to the workpiece holder arm 60, will move the ball so that the workpiece is in the most convenient orientation for the operation. He will do this by stepping on the footpedal 22 while manually moving the workpiece to its desired orientation. He will then remove his foot from footpedal 22 permitting the springs to again fully urge the lockpad against the ball 54 to securely hold the workpiece in the desired position chosen. An important feature of the invention is that the ball and socket and consequently the workpiece is maintained in a fixed position under the force of the springs and does not depend upon the application of fluid pressure to be maintained in its fixed position. This is in distinction to certain prior art systems in which the workpiece is held by fluid pressure which, if it is discontinued, could result in a rapid movement and falling of the workpiece resulting in injury or damage.

Thus the workpiece is locked in position without the application of an external source of fluid and will stay in this position until affirmatively released by the operator applying a source of fluid as by stepping on the footpedal 22. Also with the workpiece in a fixed position the system may be moved from one workstation to the next without concern for the inadvertent movement or reorientation of workpiece 76.

Having thus described the invention with particular reference to the preferred forms thereof, it will be obvious that various changes and modifications may be made therein without departing from the spirit and scope of the invention as defined in the appended claims.

I claim:

1. A work holder device comprising:
   a base member;
   piston means located above the base member;
   a plurality of equally spaced coil springs located between the base member and piston means;
   said springs being in compression to urge the piston means upwardly;
   locking means positioned on the piston means and having a spherical upper surface;
   a ball located on the said spherical upper surface of the locking means;
   housing means partially surrounding the ball to retain it in position on the locking means;
   arm means secured to the ball to receive a work piece;
   said plurality of springs providing sufficient friction between the ball and said spherical surface to lock said ball against rotation within the housing means;
   a fluid chamber in operative relationship with said piston means; and
   means to apply fluid pressure to said fluid chamber to move the said piston means against the tension springs to unlock the ball to permit rotation thereof and repositioning of the said arm means.

2. The device set forth in claim 1 in which the spherical surface on the locking means is roughed to provide friction with the ball.

3. The device set forth in claim 2 in which the fluid chamber includes a portion of an upper surface of the piston means.

4. The device set forth in claim 3 in which the means to apply fluid pressure is adjustable whereby the amount of fluid pressure may be controlled by an operator.

5. The device set forth in claim 4 in which the housing means open at the top portion to permit the arm to move at least 45 degrees from a vertical position.

6. A workpiece support for holding a workpiece in a desired predetermined position comprising;
   a spherical ball;
   support means secured to the spherical ball and adapted to have a workpiece secured thereto;
   socket means partially surrounding the spherical ball within which the ball may rotate;
   said socket means having an inner spherical surface of substantially the same radius as the spherical ball;
   said inner spherical surface of the socket means being in contact with the spherical ball;
   friction means having a spherical surface in contact with the spherical ball;
   piston means having a first surface and a second surface;
   said first surface being in contact with the friction means;
   spring means in contact with the said second surface;
   said spring means operable to urge the piston means against said friction means to lock the spherical ball against rotation; and
   fluid means being selectively operable to move the piston means against the force of the spring means to release the spherical ball for rotation within the socket means.

7. The workpiece support set forth in claim 6 in which said spring means comprises a plurality of equally spaced coil springs in compression.

8. The workpiece support set forth in claim 6 in which the fluid means includes:
   a source of fluid under pressure;
   a fluid chamber in contact with the piston means; and
   valve means connecting the source of fluid under pressure and the fluid chamber.

9. The workpiece support set forth in claim 8 including adjustable regulator means whereby the amount of fluid pressure may be selected.

10. The workpiece support set forth in claim 6 in which the socket means includes an upper socket ring and a lower socket ring;
    each of said socket rings having an inner spherical surface of substantially the same radius as the spherical ball; and
    each inner spherical surface being in contact with the spherical ball.

11. A workpiece support for holding a workpiece in a desired predetermined position comprising;
    a spherical ball;
    support means secured to the spherical ball and adapted to have a workpiece secured thereto;
    socket means partially surrounding the spherical ball within which the ball may rotate;
    friction means having a friction spherical surface in contact with the spherical ball;
    said friction physical surface and said ball being of substantially the same radius;
    piston means having a first surface and a second surface;
    said first surface being in contact with the friction means;
    spring means in contact with the said piston means second surface;
    said spring means operable to urge the piston means against said friction means to increase the friction between the friction surface and the spherical ball to lock the ball against rotation;
    fluid pressure means being selectively operable to apply fluid pressure to move the piston means against the force of the spring means to decrease the friction between the friction surface and ball to release the spherical ball for rotation within the socket means;
    means to adjust the fluid pressure of the fluid pressure means whereby the degree of friction between the friction spherical surface and the ball may be selectively controlled by an operator whereby the ball may be held in a fixed position by a predetermined amount of frictional force.

12. The workpiece support set forth in claim 11 in which said means to adjust the fluid pressure is manually adjustable by an operator.

13. The workpiece support set forth in claim 11 in which said socket means includes an upper socket ring and a lower socket ring;
    each of said socket rings having an inner spherical surface of substantially the same radius as the spherical ball; and
    each inner spherical surface being in contact with the spherical ball.

14. The workpiece support set forth in claim 11 in which the spring means comprises a plurality of equally spaced springs.

* * * * *